United States Patent [19]
Yale et al.

[11] 3,759,923
[45] Sept. 18, 1973

[54] QUINOBENZOXA(OR THIA)ZEPIN-3-ONES

[75] Inventors: Harry Louis Yale; Ramesh B. Petigara, both of New Brunswick, N.J.

[73] Assignee: E. R. Squibb & Sons, Inc., New York, N.Y.

[22] Filed: Dec. 9, 1970

[21] Appl. No.: 96,614

[52] U.S. Cl..... 260/283 S, 260/239 R, 260/283 SY, 260/287 R, 260/289 R, 260/294.8 A, 424/244, 424/258
[51] Int. Cl............................................. C07d 87/54
[58] Field of Search...................... 260/283 S, 289 R

[56] References Cited
OTHER PUBLICATIONS
Fieser & Fieser, Reagents For Organic Synthesis, Vol. I, Wiley Publishers, Pages 128, 215-219 QD 262,.F5

*Primary Examiner*—Alan L. Rotman
*Attorney*—Lawrence S. Levinson, Merle J. Smith and Donald J. Perrella

[57] ABSTRACT

Quinobenzoxa(or thia)zepin-3-one derivatives are provided having the structures

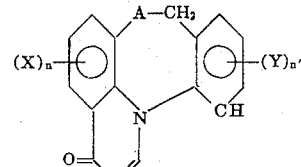

or

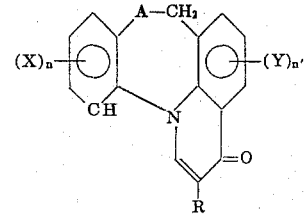

wherein X, Y, R, n, n' and A are as defined hereinafter. These compounds are useful as antifungal agents and antibacterial agents.

6 Claims, No Drawings

QUINOBENZOXA(OR THIA)ZEPIN-3-ONES

The present invention relates to quinobenzoxa(or thialzepin-3-ones derivatives of the structure

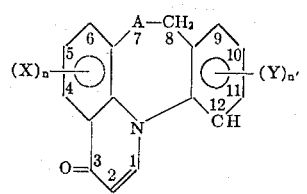

or

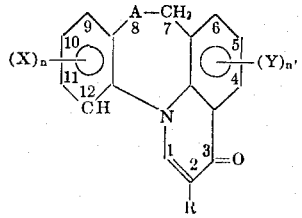

wherein X and Y are the same or different and can be halogen, trifluoromethyl, lower alkyl, lower alkylmercapto, lower alkyloxy, cyano, or di-lower alkylsulfamoyl, R is lower alkyl, halogen or hydrogen, n is 0, 1 or 2 and n' is 0, 1 or 2 and A is O, S, SO or $SO_2$.

The term "lower alkyl" as employed herein includes both straight and branched chain radicals of up to and including eight carbon atoms, for instance, methyl, ethyl, propyl, isopropyl, butyl, s-butyl, isobutyl, pentyl, hexyl, isohexyl, heptyl, 4,4-dimethylpentyl, octyl, 2,2,4-trimethylpentyl and the like. The lower alkyl group can include substituents such as aryl.

The term "halogen" includes F, Cl or Br.

The lower alkylmercapto groups contain up to 8 carbon atoms and include methylmercapto, ethylmercapto, propylmercapto and mercapto radicals containing any of the lower alkyl groups mentioned hereinbefore.

The terms "lower alkyloxy" and "lower alkoxy" are interchangeable and refer to groups containing up to eight carbon atoms and which include any of the lower alkyl groups mentioned hereinbefore attached to an oxygen atom.

In the above Formulae I and II, each of the carbocyclic aromatic rings can include 0, 1 to 2 substituents, other than hydrogen. The nature and position of the substituents in the starting materials will determine which isomer, Type I and/or Type II, is obtained.

As will be seen hereinafter, the compounds of the invention are prepared from starting materials of the structure

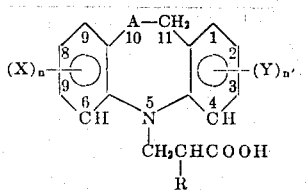

Where in the starting material IIa, n is 1 or 2 and X includes a strongly electronegative group like trifluoromethyl, cyano or di-lower alkylsulfamoyl substituent at the 7-position, and n' is O or Y is a substituent at a position other than 3 in the starting material, cyclization is directed to the 4-position so that the type II isomer is subsequently formed. However, where X is an ortho-para orienting group like halogen, especially chlorine, and n is 1 or 2 and at least one halogen is at the 7-position of starting material IIa, or Y is lower alkyl, lower alkyloxy, or lower alkylmercapto at any position or strongly electronegative group at a position other than 3 and n' is O, a mixture of the Type I and Type II isomers is obtained.

Where in the starting material IIa, n' is 1 or 2 and Y includes a strongly electronegative group like trifluoromethyl, cyano or di-lower alkylsulfamoyl at the 3-position, and n is O or X is a substituent at a position other than 7 in the starting material, cyclization is directed to the 6-position so that the Type I isomer is subsequently formed.

Where in the starting material IIa, n' is 1 or 2 and Y includes an ortho-para orienting substituent at the 3-position, and n is O or X is a substituent at a position other than 7 in the starting material, cyclization is directed to the 6-position so that the Type I isomer is subsequently formed.

Where n and n' are O, that is where there are no substituents on either aromatic ring, the Type I isomer is obtained, that is IIb 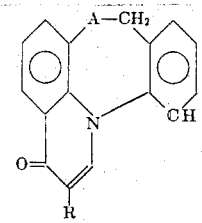

Where the starting material does not include substituents at the 3 and/or 7 positions, but does include substituents such as lower alkyl, lower alkyloxy, or lower alkylmercapto at the 1,2,8 and/or 9 positions, the Type I isomer is obtained.

Where the starting material does not include substituents at the 3 and/or 7 positions, but does include strongly electro-negative groups at the 1 and/or 9 positions, the Type I isomer is obtained. However, where the starting material unsubstituted at the 3 and/or 7 positions includes a strongly electronegative group at the 2 and/or 8 positions, then a mixture of the Type I and Type II isomers, or either Type II or Type I, respectively, is obtained.

Where X represents a strongly electronegative group like trifluoromethyl, cyano or di-lower alkylsulfamoyl and n is 1 or 2 at least one X being at the 7-position of the starting material and Y is lower alkyl, lower alkyloxy or lower alkylmercapto at any position or any of the above strongly electronegative groups at a position other than 3 in the starting material and n is 0, 1 or 2, the Type II isomer is obtained.

Where X is lower alkyl, lower alkyloxy, or lower alkylmercapto and n is 0, 1 or 2 and Y is halogen, trifluoromethyl, cyano or di-lower alkylsulfamoyl, and n' is 1 or 2 at least one Y being at the 3-position of the starting material, the Type I isomer is obtained. In this case, X can be trifluoromethyl or other strongly electronegative group so long as it is not in the 7-position of the starting material as will be seen hereinafter.

Where X is lower alkyl, lower alkyloxy, or lower alkylmercapto, and n is 1 or 2 and n' in $(Y)_n$ is O, the Type I isomer is obtained.

Where Y is lower alkyl, lower alkyloxy, or lower alkylmercapto and n' is 1 or 2 and the n in $(X)_n$ is 0, the Type II isomer is obtained.

Where both X and Y represent lower alkyl, lower alkoxy and/or lower alkylmercapto, at least one of said groups being at the 3 and 7 positions of the starting material, the Type I isomer is obtained.

Examples of compounds falling within the present invention include, but are not limited to, the following:

The symbol A in the formulae below represents -O-, -S-, -SO- and -SO$_2$-; each formula therefore, in essence, representing four species.

1. 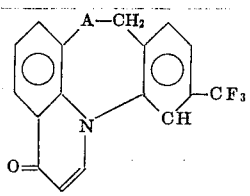

2. 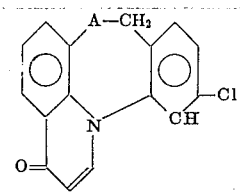

3. 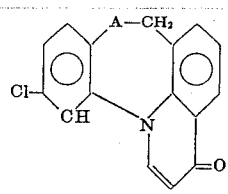

4. 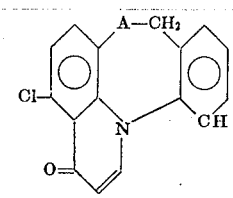

5. 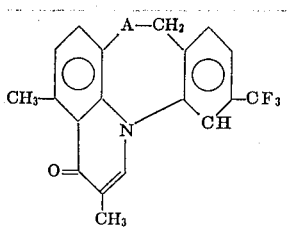

6. 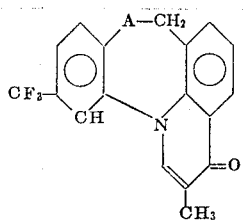

7. 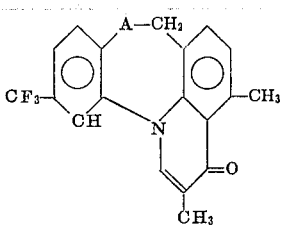

8. 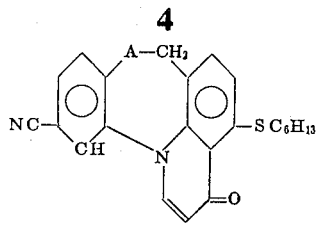

9. 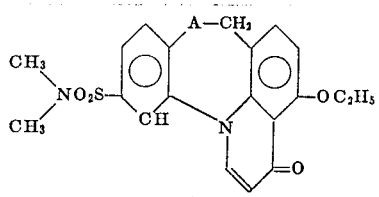

10. 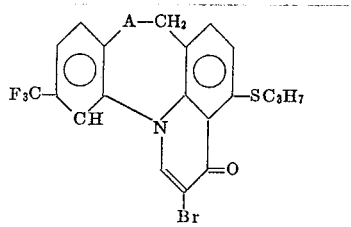

11. 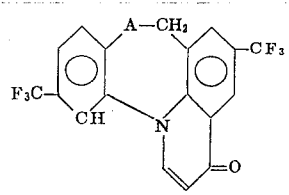

12. 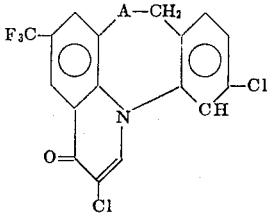

13. 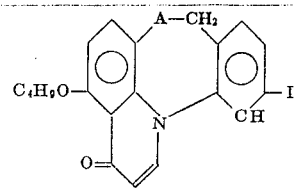

14. 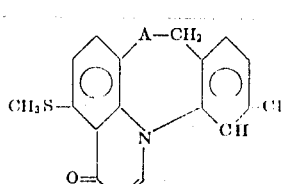

15. 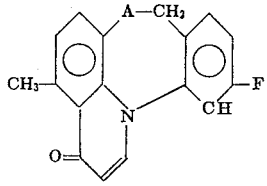

16. 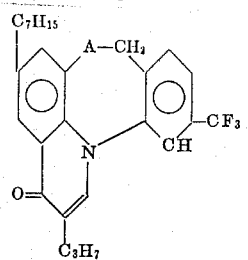
17. 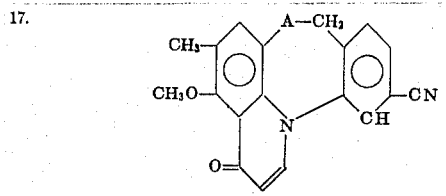
18. 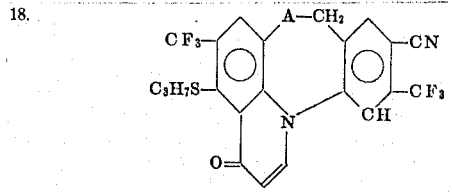
19. 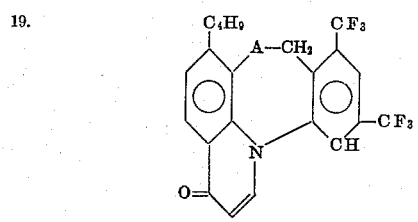
20. 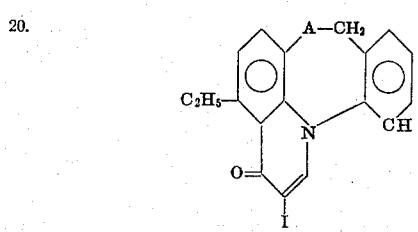
21. 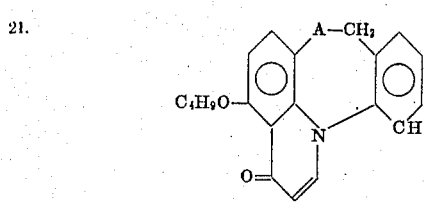
22. 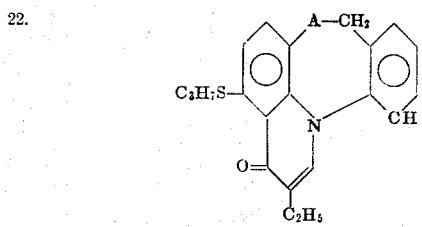
23. 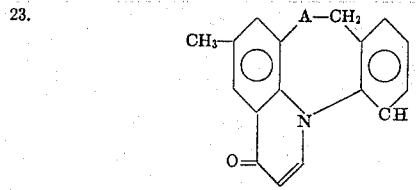
24. 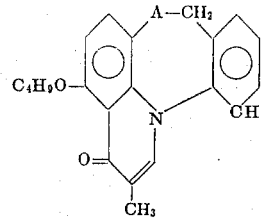
25. 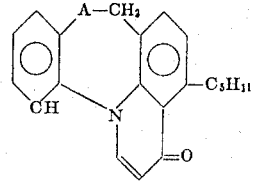
26. 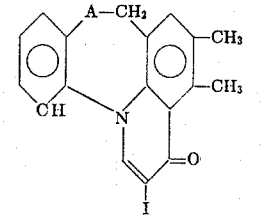
27. 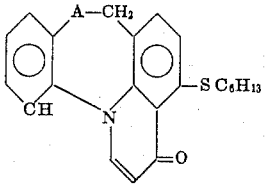
28. 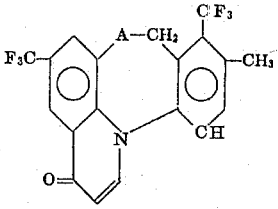
29. 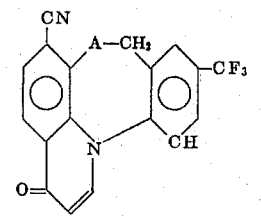
30. 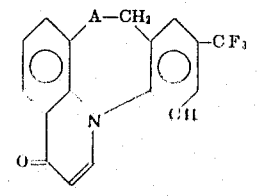
31. 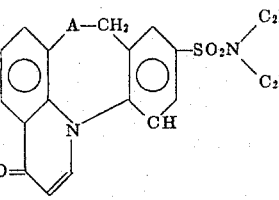

32. 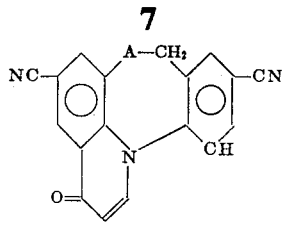

33. 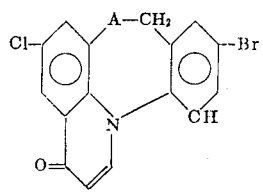

34. 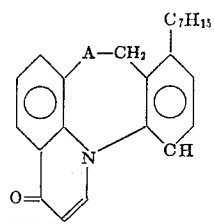

The compounds of Formulae I and II of the invention can be obtained by reacting the corresponding 1,2-dihydroquinobenzoxa(or thia)zepin-3-one of the structure

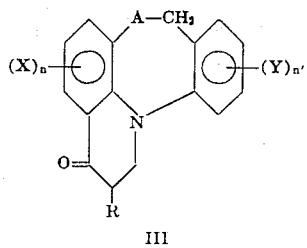

or

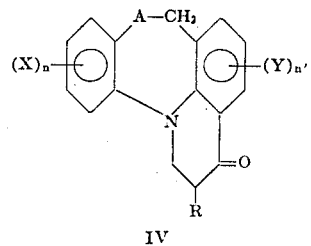

in non-aqueous solvent such as dioxane, aromatic hydrocarbons such as benzene, toluene or xylene or alcohols such as t-butanol, with 2,3-dichloro-5,6-dicyano-p-benzoquinone (DDQ) in a molar ratio of III or IV:DDQ within the range of from about 0.5:1 to about 0.7:1, at a temperature within the range of from about 80° to about 130° C.

The starting materials of the Formulae III and/or IV can be prepared by reacting a compound of the structure V 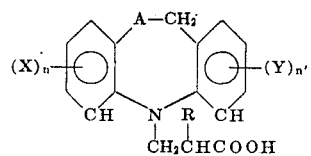

wherein X, Y, n, n', A and R are as defined hereinbefore, with a phosphorus pentahalide, such as phosphorous pentachloride, in a molar ratio of V:pentahalide of within the range of from about 0.9:1 to about 1:1, in the absence of oxygen, and in the presence of an inert solvent, such as benzene, toluene, xylene, pentane, hexane, etc., at a temperature within the range of from about 0° to about 10° C, to form an acyl halide of the structure VI 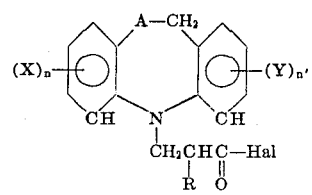

The acyl halide VI is reacted with anhydrous stannic chloride in a molar ratio of acyl halide VI:stannic chloride within the range of from about 0.4:1 to about 0.5:1, at a temperature within the range of from about 20° to about 30° C. to form the Formula III and/or IV compounds depending upon the nature and the position of the X and Y substituents.

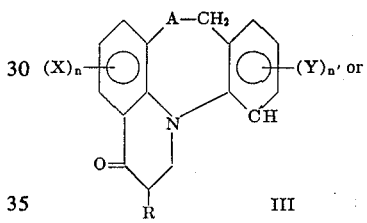

III

IV

The compounds of Formulae III and/or IV can also be prepared by reacting the starting material VII 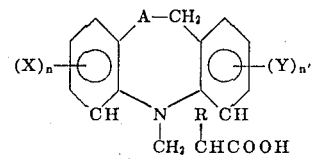

with trifluoroacetic anhydride or phosphorous pentoxide, in a molar ratio of VII:trifluoroacetic anhydride or phosphorous pentoxide of within the range of from about 0.9:1 to about 1:1, in the presence of an inert solvent such as benzene, toluene, xylene, pentane, hexane, etc., at a temperature within the range of from about 10° to about 80° C.

Compounds of the structure I and II wherein A is SO or $SO_2$ can be prepared as follows:

Compounds of the structures III or IV wherein A is S are treated with an oxidizing agent like $H_2O_2$ in an alcohol solvent or perbenzoic acid or m- chloroperbenzoic acid in a solvent like chloroform to give sulfoxides of the structures VIII or IX

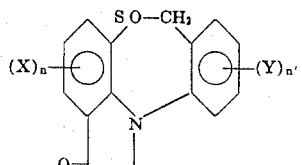

VIII

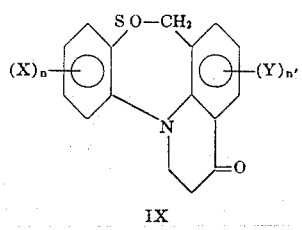

IX which are converted to the Formulae I and II compounds as described herein.

Compounds of Formulae I and II wherein A is $SO_2$ can be formed by treating III or IV (wherein A is S) with an oxidizing agent like $H_2O_2$ in formic or acetic acid to give sulfones of the structures X and XI, respectively

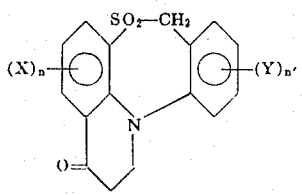

X

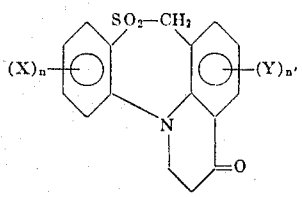

XI which are converted to the Formula I and II compounds as described herein.

In addition, sulfoxides of the structures VIII or IX can be treated with hydrogen peroxide in formic or acetic acid to obtain sulfones of the structures X or XI.

The carboxylic acid starting materials of Formula VII are prepared by several methods. One method comprises reacting compounds having the Formula XII:

XII

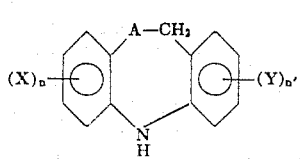

with a nitrile of the structure

XIII 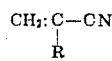

wherein R is hydrogen, lower alkyl or halogen (e.g. acrylonitrile, 2-methylacrylonitrile, 2-isopropylacrylonitrile, 2-pentylacrylonitrile, 2-chloroacrylonitrile, 2-bromacrylonitrile, 2-fluoroacrylonitrile and the like) to yield compounds of Formula XIV

XIV

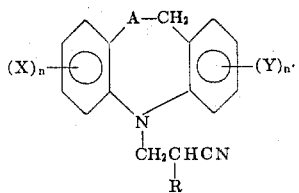

wherein n, n', R, A, S and Y are as defined herein.

This reaction is carried out by employing an excess of the nitrile as the solvent. The temperature utilized in the reaction can be varied from about 0° to about 100° C. with the preferred range being between about 0° and about 75° C. This reaction proceeds expeditiously when a small amount (up to about 1 percent) of a strong base like sodium hydroxide, sodium methoxide, potassium t-butoxide, or benzyl trimethyl-ammonium hydroxide (Triton B) is used as the catalyst.

Another procedure for preparing compounds of Formula VII is to treat the compounds of structure XIV with alcoholic hydrogen halide, such as hydrogen chloride in methanol, ethanol, and so forth, at room temperature whereby esters of the structure XV are formed.

XV

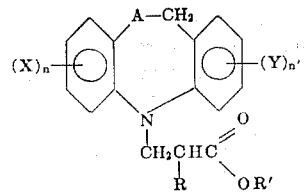

wherein R' is lower alkyl.

By saponifying compound XV with an alkali metal hydroxide, e.g., sodium hydroxide, lithium hydroxide, and so forth, the desired carboxylic acids of structure XIV can be recovered.

Examples of compounds of Formula XII where A is S are set out in U.S. Pat. Nos. 3,188,321 and 3,188,322.

Examples of compounds of Formula VII where A is O or S can be found in U.S. Pat. Nos. 3,069,432, and 3,452,046 and in a paper entitled "Novel Polycyclic Heterocycles," by Yale et al, Med. Chem. 13, 713 (1970).

Examples of compounds of Formula XII wherein A is SO or $SO_2$ can be found in the above mentioned paper by Yale et al.

Furthermore, compounds of Formula XII wherein A is so can be formed by heating a compound of the structure

XVI

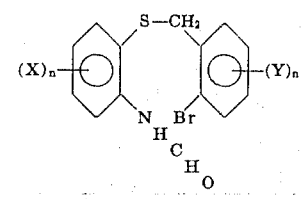

in the presence of potassium carbonate, Cu bronze, and a suitable solvent and treating the product with ether to give compounds of the structure XVII 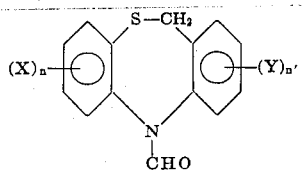

and treating compound XVII with m-chloroperbenzoic acid in the presence of chloroform and then treating with ether to give a compound of the structure XVIII XVIII 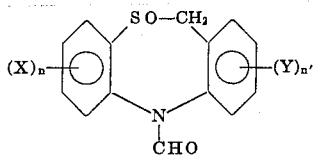

which can be treated with alcohol such as ethanol and base such as aqueous sodium hydroxide to form a compound of the structure XIX 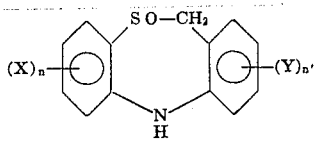

Compounds of Formula XII wherein A is $SO_2$ can be formed by treating compounds of the structure XX 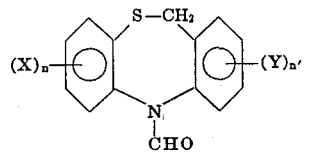

with an oxidizing agent such as hydrogen peroxide in the presence of formic acid to form a compound of the structure XXI 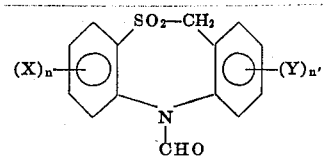

and treating XXI with an alcohol such as ethanol and base such as aqueous sodium hydroxide to form a compound of the structure XXII 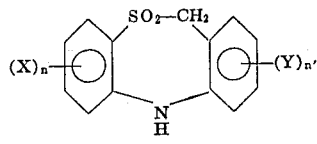

Examples of carboxylic acid starting materials which can be employed in preparing the compounds of the invention include, but are not limited to, the following wherein A is O, S, SO or $SO_2$:

1. 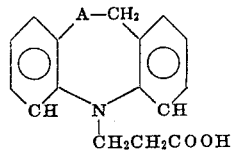

2. 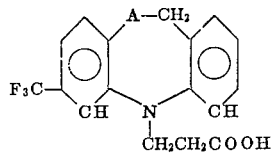

3. 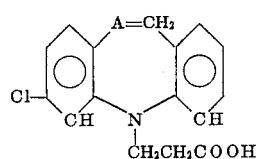

4. 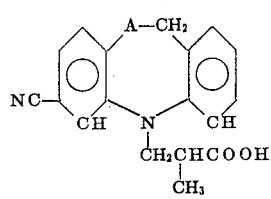

5. 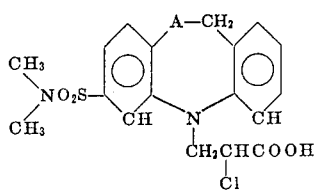

6. 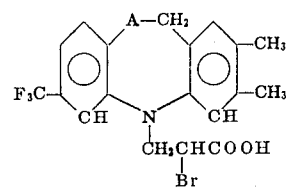

7. 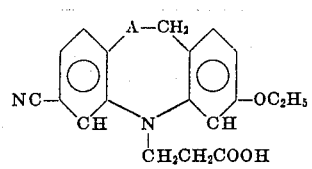

8. 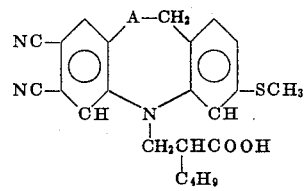

9. 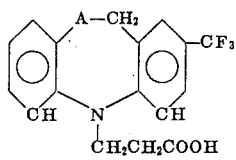

10. 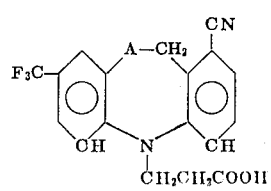

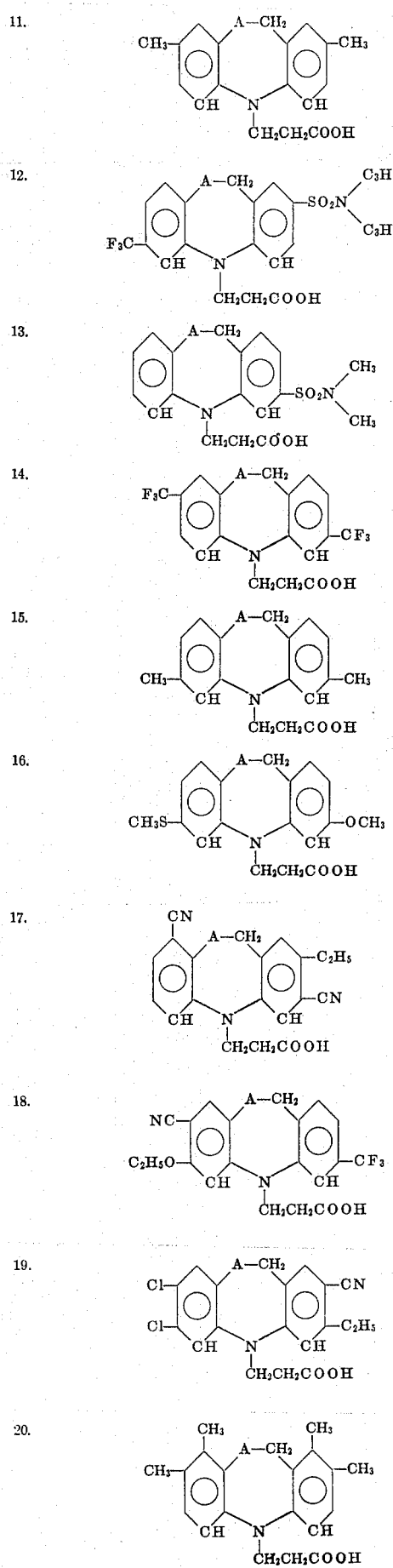

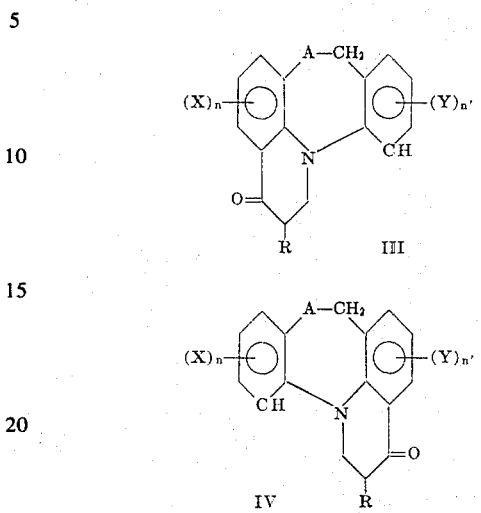

The above starting materials can be employed in the form of their corresponding salts as will be apparent to one skilled in the art.

The intermediates of structures III and IV namely wherein R is halogen or lower alkyl are novel intermediates. Examples of such compounds correspond to the examples of the dehydro compounds of the invention set out herein wherein R is other than hydrogen.

The new compounds of Formulae I and II are useful as antimicrobial agents and may be used to combat infections in animal species, such as mice, rats, dogs, guinea pigs and the like, due to organisms such as Trichomonas vaginalis, Trichomonas foetus, Staphyloccocus aureus, Salmonella schottmuelleri, Klebsiella pneumoniae, Proteus vulgaris, Escherichia coli, C. albicans or Trichophyton mentagrophytes. For example, a compound or mixture of compounds of Formulae I and II may be administered orally to an infected animal, e.g., to a mouse, in an amount of about 5 to 25 mg. per kg. per day in 2 to 4 divided doses. These may be conventionally formulated in a tablet, capsule or elixir containing about 10 to 250 mg. per dosage unit, by compouding the active substance or substances with the conventional excipient, vehicle, binder, preservative, flavor, etc., as called for by accepted pharmaceutical practice. They may also be applied topically, e.g., to dermatophytosis in a guinea pig, in a lotion, salve or cream at a concentration of about 0.1 to 3 percent by weight.

They may also be used as surface disinfectants. About 0.01 to 1 percent by weight of any of these substances may be dispersed on an inert solid or in a liquid such as water and applied as a dust or spray. They may be incorporated also, for example, in a soap or other cleansing agent, e.g., a solid or liquid detergent, detergent composition, for example, in general cleaning, in cleaning dairy barns or equipment or cleaning food handling or processing equipment.

The following examples are illustrative of the invention. All temperatures are on the Centigrade scale.

EXAMPLE 1

3H,8H-quino[1,8-a,b][4,1]benzoxazepin-3-one

A. 5,11-Dihydrodibenz[b,e][1,4]oxazepine-5-propionic acid

A suspension of 30.4 g of 5,11-dihydrodibenz[b,e][1,4]-oxazepine in 90 ml of acrylonitrile is cooled to 0°–5°. To this is added with efficient stirring and cooling 0.9 ml of Triton B. The suspension becomes homogeneous and a red solution results with the rise of temperature to 10°. The reaction mixture is allowed to come to room temperature and then refluxed for one hour with stirring. The excess of acrylonitrile is removed by known means, water is added, and the solid is filtered. The solid is dried, powdered, and extracted with five 400 ml portions of diethyl ether. The diethyl ether extracts are dried and concentrated to a volume of 250 ml. The white crystalline compound is filtered. The filtrate is again concentrated and the resulting solid is filtered and found to melt to about 138°–139.5°, and is identified as 5,11-dihydrodibenz[b,e][1,4]oxazepine-5-propionitrile.

The 5,11-dihydrodibenz[b,e][1,4]oxazepine-5-propionitrile, 5.0 g, is dissolved in 80 ml of dry dioxane and to this 55 ml of 30 percent methanolic hydrogen chloride is added. The solution is stirred for 72 hours, 2 ml of water added, and then concentrated to 30 ml, filtered, and the filtrate concentrated to give 5,11-dihydrodibenz[b,e][1,4]oxazepine-5-propionic acid, methyl ester, mp about 70°–72°.

A solution of the methyl ester, 5 g., 440 ml of methanol, and 1.1 g. of potassium hydroxide in 60 ml of water is refluxed for 4 hours, and concentrated in vacuo. The residue is dissolved in 120 ml of water and the solution acidified to give 5,11-dihydro[b,e][1,4]oxazepine-5-propionic acid mp about 203°–205°.

B. 1,2-Dihydro-3H,8H-quino[1,8-a,b][4,1]benzoxazepin-3-one

In a 500 ml flask equipped with stirring bar, thermometer, nitrogen inlet, dropping funnel and CaCl$_2$ guard tube, is suspended 10.8 g. of 5,11-dihydrodibenz[b,e][1,4]oxazepine-5-propionic acid in 220 ml of C$_6$H$_6$. This is cooled to 10°, and to it is added a solution of 9.5 g. of PCl$_5$ in 50 ml of benzene in 45 minutes. The reaction mixture is stirred for 1.5 hr. at room temperature. To the resulting solution, 5.5 g. of sodium hydrosulfite is added and stirred for 15 minutes. The reaction mixture is filtered and the filtrate is concentrated in vacuo to yield a liquid residue. The residue is triturated with 70 ml of petroleum ether to give a yellow solid, which is filtered. Of the acid chloride residue (9.6 g.), 8.6 g. are dissolved immediately in 220 ml of benzene.

The above solution of 8.6 g of the acid chloride in 220 ml of benzene is placed in a flask equipped with a stirrer, a dropping funnel, and a reflux condenser guarded with a CaCl$_2$ tube. To this, while stirring, is added dropwise, a solution of 9.0 ml of anhydrous SnCl$_4$ is 50 ml of benzene. A viscous red complex forms which turns to violet towards the end of the addition. The reaction mixture is stirred for 1 hour and then 600 ml of ether is added. To this, 20 ml of conc. HCl and 150 ml of distilled H$_2$O are added and the mixture stirred vigorously for 1 hour. The organic phase is separated, washed, filtered, and solvent removed and the residue is extracted successively with 300, 200, and 200 ml portions of boiling cyclohexane. The combined cyclohexane extracts are concentrated to 75 ml to give 2.9 g of product, mp about 116°–118°.

C. 3H,8H-Quino[1,8-a,b][4,1]benzoxazepin-3-one

To 2.5 g of 1,2-dihydro-3H,8H-quino[1,8-a,b][4,1]-benzoxazepin-3-one in 50 ml of anhydrous o-xylene is added 2.8 g of 2,3-dichloro-5,6-dicyano-p-benzoquinone and the mixture is heated under flux for 24 hours. The mixture is then filtered and the filtrate concentrated to dryness in vacuo. The residue is dissolved in 300 ml of a mixture of methylene dichloride and ether (1:3) washed successively with dilute alkali, with water and with saturated sodium chloride solution, dried and filtered. The filtrate is concentrated to dryness in vacuo to give 2.1 g of a yellow solid which on recrystallization from ethanol yields a yellow solid, mp about 165°–167°.

EXAMPLE 2

11-Chloro-3H,8H-quino[1,8-a,b][4,1]benzoxazepin-3-one

A. 3-Chloro-5,11-dihydrodibenz[b,e][1,4]oxazepine-5-propionic acid

A suspension of 24.4 g of 3-chloro-5,11-dihydrodibenz [b,e][1,4]oxazepine in 55 ml of acrylonitrile is cooled to 0°–5°. To this is added with efficient stirring, and cooling, 0.3 ml of Triton B, pausing after each drop of addition. The temperature rises slowly from 3° to 14° and then rapidly to 45° within 5 minutes with the formation of red colored clear solution. The mixture is cooled to 5°–10°, stirred for 5 minutes, allowed to come to room temperature and then slowly heated to reflux temperature. After 1 hour heating under reflux, the excess of acrylonitrile is removed in vacuo. The residue is extracted with 3–350 ml portions of diethyl ether, the combined diethyl ether extracts are treated with 3.0 g of Darco and 1.0 g of Hyflo, filtered; the filtrate is dried, and concentrated to give 31.6 g of 3-chloro-5,11-dihydrodibenz [b,e][1,4] oxazepine-5-propionitrile, b.p. about 200°–210° (0.2 mm).

The 3-chloro-5,11-dihydrodibenz[b,e]]1,4]oxazepine-5-propionitrile, 71.10 g, is dissolved in 1,200 ml of dry dioxane and to this 800 ml of 30 percent methanolic hydrogen chloride is added. The solution is stirred for 72 hours, 30 ml of H$_2$O is added, the mixture is stirred for 0.5 hour, concentrated in vacuo to 400 ml, filtered, and the filtrate concentrated to dryness in vacuo. The residue solidifies on keeping to yield 3-chloro-5,11-dihydrodibenz[b,e][1,4]oxazepine-5-propionic acid, methyl ester.

The 3-chloro-5,11-dihydrodibenz[b,e][1,4]oxazepine-5-propionic acid, methyl ester, 25.4 g, is dissolved in 2,200 ml of MeOH and to this 5.6 g of KOH dissolved in 300 ml of H$_2$O is added. The solution is refluxed for 4 hours, and then is concentrated in vacuo. The residue is taken up in 600 ml of H$_2$O, the solution is cooled, and then acidified with 2 percent aqueous HCl. The solid is filtered and dissolved in 600 ml of C$_6$H$_6$. This solution is treated with Darco and then extracted with 600 ml of 2 percent aqueous NaOH solution. The extracts are treated with Darco and Hyflo, filtered and the filtrate is acidified with 2 percent aqueous HCl. The solid is filtered and recrystallized from C$_6$H$_6$ to yield 3-chloro-5,-11-dihydrodibenz[b,e][1,4]oxazepine-5-propionic acid, mp about 138°–140°.

B. 11-Chloro-1,2-dihydro-3H,8H-quino[1,8-a,b][4,1]-benzoxazepin-3-one 3.7 g of 3-chloro-5,11-dihydro[b,e][1,4]oxazepine-5-propionic acid is dissolved in 20 ml of warm benzene and the resulting colorless solution is allowed to come to 30°, and to this, 1.9 ml (2.8 g) of (CF$_3$CO)$_2$O is added dropwise. The reaction mixture is slowly heated to reflux, the reflux is maintained for 5 minutes, and the mixture is poured into 250 ml of cold water. To this, 150 ml of benzene is added, and stirred for a few minutes. The benzene layer is separated, washed, dried, filtered, and concentrated to dryness. The residue is recrystallized first from 2-propanol and then from cyclohexane to give 2.3 g of product, mp about 142°–144°.

C. 11-Chloro-3H,8H-quino[1,8-a,b][4,1]benzoxazepin-3-one

To 2.85 g of 11-chloro-1,2-dihydro-3H,8H-quino[1,8-a,b]-[4,1]benzoxazepin-3-one in 50 ml of t-butanol is added 3.0 g of 2,3-dichloro-5,6-dicyano-p-benzoquinone and the mixture is heated under reflux for 24 hours. The mixture is then filtered and the filtrate concentrated to dryness in vacuo. The residue is dissolved in 300 ml of a mixture of methylene dichloride and ether (1:3), washed successively with dilute alkali, with water and with saturated sodium chloride solution, dried and filtered. The filtrate is concentrated to dryness in vacuo to give 2.6 g of a yellow solid which on recrystallization from ethanol yields a yellow solid, mp about 235°–238°.

EXAMPLE 3

11-(Trifluoromethyl)-3H,7H-quino[8,1-c,d][1,5]benzthiazepin-3-one

A. 5,11-Dihydro-7-(trifluoromethyl)dibenz[b,e][1,4]-thiazepine-5-propionic acid

To 50.0 g of 5,11-dihydro-7-(trifluoromethyl)dibenz-[b,e][1,4]thiazepine in 60 ml of redistilled acrylonitrile is added in 5 minutes 0.80 ml of Triton B. Subsequently, the mixture is heated for 1 hour under reflux and the product isolated by extraction with benzene to give 5,11-dihydro-7-(trifluoromethyl)dibenz[b,e][1,4]thiazepine-5-propionitrile, mp about 161°–163°.

7-(Trifluoromethyl)5,11-dihydrodibenz[b,e][1,4]thiazepine-5-propionitrile, 15.0 g, is dissolved in 240 ml of dry dioxane and to this 140 ml of 30 percent methanolic hydrogen chloride is added. The solution is stirred for 36 hours, 6 ml of $H_2O$ is added, stirred 0.5 hour, and then concentrated in vacuo to 120 ml. The solid is filtered, and the filtrate is concentrated to dryness in vacuo. The residual liquid is taken up in 200 ml of diethyl ether, treated with Darco and Hyflo, the diethyl ether solution is concentrated and the residue distilled in vacuo to give 5,11-dihydro-7-(trifluoromethyl)dibenz[b,e][1,4]thiazepine-5-propionic acid, methyl ester, b.p. about 166°–168° (0.08 mm.), mp about 70.0° 71.5°.

7-(Trifluoromethyl-5,11-dihydrodibenz[b,e][1,4]thiazepine-5-propionic acid, methyl ester, 3.15 g, is dissolved in 315 ml of methanol and to this 0.5 g of potassium hydroxide dissolved in 25 ml of water is added. The mixture is refluxed for 2.5 hours and then concentrated in vacuo. The residue is taken up in 250 ml of water and this solution is acidified with 2 percent aqueous HCl to give 5,11-dihydro-7-(trifluoromethyl)-dibenz[b,e][1,4]thiazepin-5-propionic acid, mp about 94°–96°.

B. 1,2-Dihydro-11-(trifluoromethyl)-3H,7H-quino-[8,1-c,d][1,5]-benzthiazepin-3-one A solution of 6.86 g of 5,11-dihydro-7-(trifluoromethyl)dibenz[b,e][1,4]thiazepine-5-propionic acid in 50 ml of benzene is cooled to 5°–10°. To this is added dropwise with stirring a solution of 4.6 g of $PCl_5$ in 25 ml of benzene over a period of 15 minutes. The solution is stirred at 25° for 40 minutes and then at 40°–50° for another 20 minutes. The reaction mixture is then heated at 55° for 10 minutes, cooled to 10° and to this is added dropwise with stirring a solution of 12.0 g anhydrous $SnCl_4$ in 20 ml of benzene. After stirring 20 minutes at 10° and 20 minutes at room temperature, 100 ml of ether is added, followed by 10 ml of concentrated hydrochloric acid, and then 100 ml of water. After stirring vigorously for 10 minutes, the organic phase is separated, and the aqueous phase is extracted with 100 ml of ether. The combined organic extracts are washed, dried, filtered, and concentrated to dryness to give 6.9 g of residue; this is crystallized from 2-propanol to give 4.3 g of product, mp about 140°–142°.

C. 11-(Trifluoromethyl)-3H,7H-quino[8,1-c,d][1,5]-benzthiazepin-3-one

To 2.5 g of 11-(trifluoromethyl)-1,2-dihydro-3H,7H-quino[8,1-c,d][1,5]benzthiazepin-3-one in 50 ml of anhydrous dioxane is added 2.3 g of 2,3-dichloro-5,6-dicyano-p-benzoquinone and the mixture is heated under reflux for 24 hours. The mixture is then filtered and the filtrate concentrated to dryness in vacuo. The residue is dissolved in 300 ml of a mixture of methylene dichloride and ether (1:3), washed successively with dilute alkali, with water and with saturated sodium chloride solution, dried and filtered. The filtrate is concentrated to dryness in vacuo to give 2.1 g of a yellow solid which on recrystallization from ethanol yields a white crystalline product, mp about 169–171.

EXAMPLE 4

11-(Trifluoromethyl)-3H,7H-quino[8,1-c,d][1,5]benzthiazepin-3-one, 8-oxide

To a solution of 3.35 g of 1,2-dihydro-11-(trifluoromethyl)3H,7H-quino[8,1-c,d][1,5]benzthiazepin-3-one in 40 ml of $CHCl_3$ is added 1.8 g of m-chloroperbenzoic acid, and the mixture refluxed for 7 hours, cooled, and washed with 5 percent aqueous $NaCO_3$ solution, followed by water, dried, and filtered. Removal of solvent gives 3.4 g of residue, which is crystallized from cyclohexane to give 1.8 g of 1,2-dihydro-11-(trifluoromethyl)-3H,7H-quino[8,1-c,d][1,5]benzthiazepin-3-one, 8-oxide which is dehydrogenated as described in Example 3 to form the title compound.

EXAMPLE 5

11-(Trifluoromethyl)-3H,7H-quino[8,1-c,d][1,5]benzthiazepine-3-one, 8,8-dioxide

To a suspension of 3.35 g of 1,2-dihydro-11-(trifluoromethyl)-3H,7H-quino[8,1-c,d][1,5]benzthiazepin-3-one in 15 ml of 98–100 percent formic acid is added dropwise 5 ml of 30 percent $H_2O_2$, while stirring at 60°. The reaction mixture is heated at 60° for 4 hours, and concentrated to dryness in vacuo. The residue is crystallized from toluene to give 2.3 g of 1,2-dihydro-11-(trifluoromethyl)-3H,7H-quino[8,1-c,d][1,5]benzthiazepin-3-one which is dehydrogenated as described in Example 3 to form the title compound.

This 1,2-dihydro compound is also obtained from the sulphoxide obtained in Example 4, by the action of $H_2O_2$-$HCOO_2H$ as described in Example 5.

EXAMPLES 6 TO 29

Employing the procedure described in Examples 1 or 3, but substituting the starting material shown in the left hand column of Table I below, the product shown in the right hand column is obtained. In Table I, A can be S, O, SO or $SO_2$.

TABLE I

| | Starting material | Product |
|---|---|---|
| Example No.: | | |
| 6 | *structure: dibenzo ring with A-CH₂ bridge, F₃C substituent, N-CH₂CH₂COOH* | *structure: tricyclic product with F₃C substituent, C=O* |
| 7 | *structure: dibenzo ring with A-CH₂ bridge, F₃C and OCH₃ substituents, N-CH₂CH₂COOH* | *structure: tricyclic product with F₃C and OC substituents, C=O* |
| 8 | *structure: dibenzo ring with A-CH₂ bridge, NC substituent, N-CH₂CH₂COOH* | *structure: tricyclic product with NC substituent, C=O* |
| 9 | *structure: dibenzo ring with A-CH₂ bridge, (H₃C)₂NO₂S and CH₃ substituents, N-CH₂CH₂COOH* | *structure: tricyclic product with (H₃C)₂NO₂S and CH substituents, C=O* |
| 10 | *structure: dibenzo ring with A-CH₂ bridge, (C₂H₅)₂NO₂S, CH₃ and CH₃ substituents, N-CH₂CH₂COOH* | *structure: tricyclic product with (C₂H₅)₂NO₂S, CH₃ substituents, C=O* |
| 11 | *structure: dibenzo ring with A-CH₂ bridge, H₃C, F₃C and CF₃ substituents, N-CH₂CH₂COOH* | *structure: tricyclic product with H₃C, F₃C and CF₃ substituents, C=O* |
| 12 | *structure: dibenzo ring with A-CH₃ bridge, F substituent, N-CH₂CH₂COOH* | *structure: tricyclic product with A-CH₂ bridge, F substituent, C=O* |
| 13 | *structure: dibenzo ring with A-CH₂ bridge, H₃C and F substituents, N-CH₂CH₂COOH* | *structure: tricyclic product with H₃C and F substituents, C=O* |

Table I—Continued

| Example No.: | Starting material | Product |
|---|---|---|
| 14 | dibenzazepine with A–CH₂ bridge, N–CH₂CH₂COOH | cyclized product with N–C(=O)–CH=CH– fused ring |
| 15 | H₅C₂-substituted and CH₃, C₂H₅-substituted dibenzazepine, N–CH₂CH₂COOH | corresponding cyclized product |
| 16 | CF₃ and SC₂H₅ substituted dibenzazepine, N–CH₂CH₂COOH | corresponding cyclized product |
| 17 | CH₃ and thienyl (S) substituted dibenzazepine, N–CH₂CH₂COOH | corresponding cyclized product |
| 18 | Cl-substituted dibenzazepine, N–CH₂CH₂COOH | corresponding cyclized product |
| 19 | Br-substituted dibenzazepine, N–CH₂CH₂COOH | corresponding cyclized product |
| 20 | CH₃ and Cl substituted dibenzazepine, N–CH₂CH₂COOH | corresponding cyclized product |

Table I—Continued
| Example No.: | Starting material | Product |
|---|---|---|
| 21 | 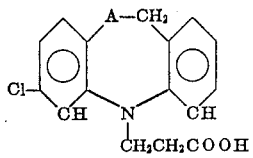 | 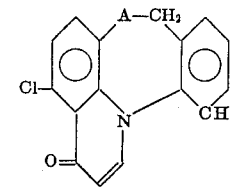 |
| 22 | 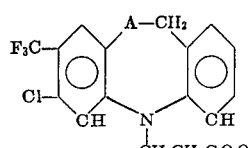 | 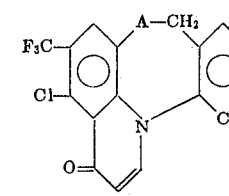 |
| 23 | 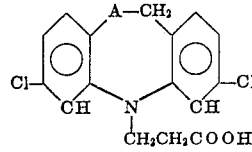 | 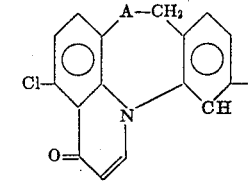 |
| 24 | 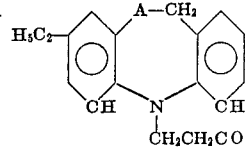 | 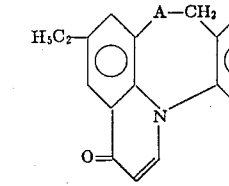 |
| 25 | 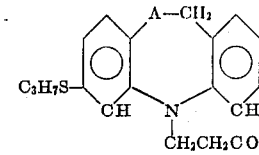 | 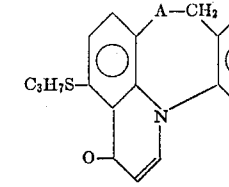 |
| 26 | 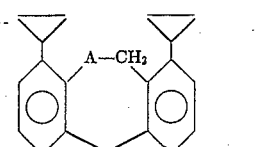 | 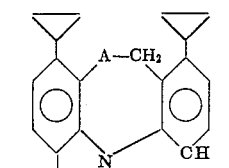 |
| 27 | 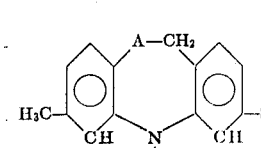 | 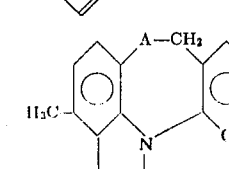 |

Table I—Continued

| Example No.: | Starting material | Product |
|---|---|---|
| 28 | [structure: dibenzazepine with A—CH₂ bridge, C₂H₅O and CN substituents, N—CH₂CH₂COOH] | [structure: cyclized product with C₂H₅O and CN substituents, N fused to C=O] |
| 29 | [structure: dibenzazepine with A—CH₂ bridge, H₃C, C₅H₁₁S and Cl substituents, N—CH₂CH₂COOH] | [structure: cyclized product with H₃C, C₅H₁₁S and Cl substituents, N fused to C=O] |

EXAMPLES 30 TO 36

Employing the procedure of Example 1, but substituting the 5,11-dihydrodibenz[b,e][1,4]oxa(or thia)zepine shown in Column 1 of Table II below and the nitrile shown in Column 2, the product shown in Column 3 is obtained.

TABLE II

| Example No.: | Column 1 | Column 2 | Column 3 |
|---|---|---|---|
| 30 | [dihydrodibenzoxa(thia)zepine with F₃C substituent] | CH₂:CH—CN with CH₃ | [product with F₃C and CH₃ substituents] |
| 31 | [dihydrodibenzoxa(thia)zepine with NC substituent] | CH₂:CH—CN with Cl | [product with NC and Cl substituents] |
| 32 | [dihydrodibenzoxa(thia)zepine with (H₃C)₂NO₂S substituent] | CH₂:CH—CN with C₃H₇ | [product with (H₃C)₂NO₂S and C₃H₇ substituents] |
| 33 | [unsubstituted dihydrodibenzoxa(thia)zepine] | CH₂:CH—CN with Br | [product with Br substituent] |
| 34 | [dihydrodibenzoxa(thia)zepine with CH₃ and Cl substituents] | CH₂:CH—CN with C₄H₉ | [product with CH₃, Cl and C₄H₉ substituents] |

TABLE II – Continued

| | Column 1 | Column 2 | Column 3 |
|---|---|---|---|
| Example No.: | | | |
| 35 | 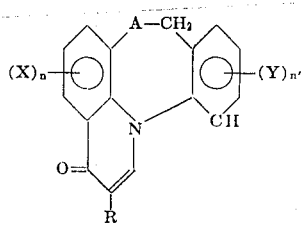 | CH$_2$:CH—CN<br>F | 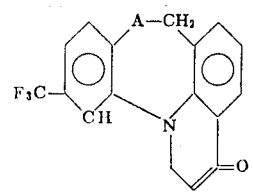 |
| 36 | 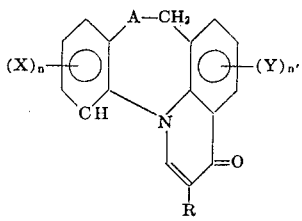 | CH$_2$:CH—CN<br>Cl | 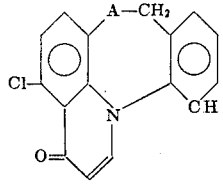 |

What is claimed is:

1. A compound of the structure:

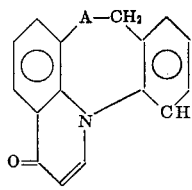

or

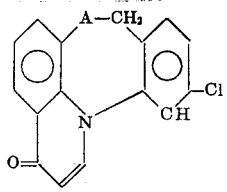

wherein X and Y are the same or different and are selected from the group consisting of halogen and trifluoromethyl, n is 0, 1 or 2 and n' is 0, 1 or 2, R is lower alkyl, halogen, or hydrogen and A is O or S.

2. A compound in accordance with claim 1 having the structure

3. A compound in accordance with claim 1 having the structure

4. A compound in accordance with claim 1 having the structure

5. A compound in accordance with claim 1 having the structure

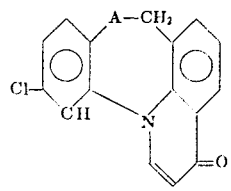

6. A compound in accordance with claim 1 having the structure

* * * * *

UNITED STATES PATENT OFFICE
CERTIFICATE OF CORRECTION

Patent No. 3,759,923                  Dated September 18, 1973

Inventor(s) Harry L. Yale and Ramesh B. Petigara

It is certified that error appears in the above-identified patent and that said Letters Patent are hereby corrected as shown below:

Column 1, line 3, "thialzepin " should read: -- thia)zepin --.

Column 3, formula 7, that portion of the formula reading:

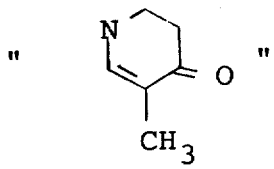   should read: -- 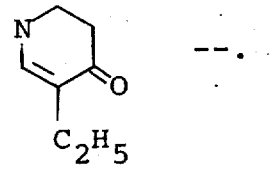 --.

Column 10, line 4, "2-bromacrylonitrile," should read: -- 2-bromoacrylonitrile, --.

Column 10, line 52, "Med. Chem." should read: -- J. Med. Chem. --.

Column 10, line 58, "so" should read: -- SO --.

Column 12, formula 3, that portion of the formula reading: "A=CH$_2$" should read: -- A—CH$_2$ --.

Column 16, line 33, "[b,e]]1,4]" should read: -- [b,e][1,4] --.

Column 20, Example 7, Product Column, that portion of the formula reading:

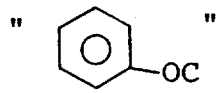   should read: -- 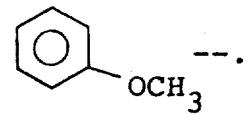 --.

UNITED STATES PATENT OFFICE
CERTIFICATE OF CORRECTION    Page 2

Patent No.  3,759,923            Dated September 18, 1973

Inventor(s) Harry L. Yale and Ramesh B. Petigara

It is certified that error appears in the above-identified patent and that said Letters Patent are hereby corrected as shown below:

Column 20, Example 9, Product Column, that portion of the formula reading:

" 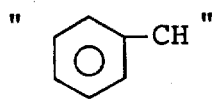 "    should read: -- 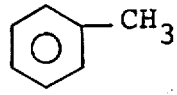 --.

Column 20, Example 10, Product Column, that portion of the formula reading:

" 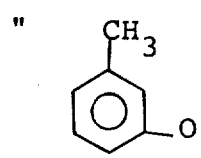 "    should read: -- 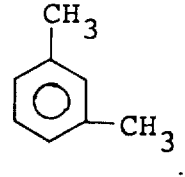 --.

Column 22, Example 15, Product Column, that portion of the formula reading:

" 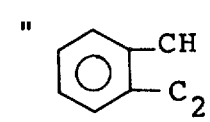 "    should read: -- 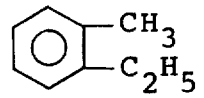 --.

Column 24, Example 24, Product Column, that portion of the formula reading:

" 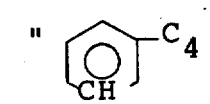 "    should read: -- 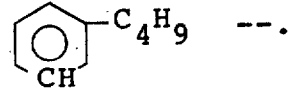 --.

Column 26, Example 29, Product Column, that portion of the formula reading:

" 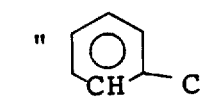 "    should read: -- 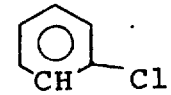 --.

Signed and sealed this 16th day of July 1974.

(SEAL)
Attest:

McCOY M. GIBSON, JR.                C. MARSHALL DANN
Attesting Officer                   Commissioner of Patents